United States Patent

[11] 3,611,381

[72] Inventors Fritz K. Preikschat
Bellevue;
Orral W. Ritchey, Seattle; John H. Nitardy,
Seattle, all of Wash.

[21] Appl. No. 772,741
[22] Filed Nov. 1, 1968
[45] Patented Oct. 5, 1971
[73] Assignee The Boeing Company
Seattle, Wash.

[54] PILOT NORMALIZED MULTIBEAM DIRECTIONALLY SELECTIVE ARRAY SYSTEM
10 Claims, 5 Drawing Figs.

[52] U.S. Cl. ........................................ 343/100, 343/854
[51] Int. Cl. ........................................ H04b 7/04, H01q 3/26
[50] Field of Search ........................................ 343/100.6 R, 854

[56] References Cited

UNITED STATES PATENTS 3,175,216 3/1965 Enloe .......................... 343/100 (.6 R)
3,394,374 7/1968 Weiss .......................... 343/100 (.6 R)

*Primary Examiner*—Rodney D. Bennett, Jr.
*Assistant Examiner*—T. H. Tubbesing
*Attorney*—Christensen & Sanborn ABSTRACT: One or more independently modulated directionally controlled beams in either or both reception and transmission are simultaneously obtainable in the same frequency range from this pilot beam oriented array system which basically utilizes the retrodirective array principle. Received pilot signal RF energy at frequency $\omega_o+\omega_S$ incident on the array is converted in each antenna module into an intermediate frequency signal $\omega_R-\omega_S$. It is then converted by $\omega_R$ into $\omega_S$. These conversions take place in a phase-lock loop wherein such $\omega_S$ thus extracted is effectively cophased with $\omega_S$ in the other modules by mixing (1) $\omega_O+\omega_S$ and (2) a receiver local oscillation produced in each module. This local oscillation in turn is produced by mixing $\omega_O$ and $\omega_R(\Phi)$, where $\omega_O$ is a high-frequency reference signal and $\omega_R(\Phi)$ is a low-frequency reference signal $\omega_R$ (common to the modules) given a phase shift $\Phi$ in each particular module corresponding to the phase difference between the received pilot signal $\omega_S$ in that module and the $\omega_S$ received in one of the antennas serving as a phase-reference in the array. Phase conjugation of the received pilot signal in each module for pilot-oriented retrodirective transmission is performed by extracting the difference product of the aforementioned mixing of $\omega_O$ and $\omega_R(\Phi)$ and mixing this difference product with an IF signal $\omega_R-\omega'_S$ to produce $\omega_O-\omega'_S$, where $\omega'_S$ is a signal to be transmitted, and the resultant transmitted RF signal $\omega_O-\omega_S$ is in a band adjacent to the received RF pilot signal $\omega_O+\omega_S$ but is separable therefrom by RF filters in the antenna input-output channels.

Maximum array gain for other desired receiving directions related to but differing from the pilot beam direction of incidence on the array is achieved by mixing in each module: (1) the respective IF signals $\omega_R-\omega_{S1}$, $\omega_R-\omega_{S2}$, etc., resulting from the aforementioned mixing of the receiver local oscillation with the RF signals received from these other directions and (2) the low-frequency reference signal $\omega_R$ phase-shifted in the appropriate sense by predetermined different amounts corresponding to the respective receiving beam directions desired. Such amounts of phase shift for each beam direction are graduated along the series of array modules in correspondence with the phase differences between antennas resulting from antenna spacings.

Maximum array gain for other desired transmitting directions related to but differing from the pilot beam direction of incidence on the array is achieved by mixing in each module: (1) the respective desired signals ($\omega'_{S1}$, $\omega'_{S2}$, etc.) to be transmitted in these other directions and 2(2) the low-frequency reference signal $\omega_R$ phase-shifted in the appropriate sense opposite that for the above case of reception by predetermined amounts corresponding to the respective transmitting beam directions desired. Such amounts of phase shift for each such beam direction are graduated along the series of array modules in correspondence with the phase differences between antennas resulting from antenna spacings. The resulting sets of IF signals to be transmitted $\omega_R-\omega'_{S1}(+\Delta1\Phi)$, $\omega_R-\omega'_{S2}(+\Delta2\Phi)$, etc., in turn, are mixed with the aforesaid difference product of the mixing of $\omega_O$ and $\omega_R(\Phi)$ so as to produce resultant sets of antenna-energizing RF signals from the modules.

PILOT NORMALIZED MULTIBEAM DIRECTIONALLY SELECTIVE ARRAY SYSTEM

This invention relates to improvements in antenna array systems and more particularly concerns directional array systems employing electrical phase control techniques to orient and normalize the antenna array electrically in relation to a received beam from a remote pilot station independently of physical misalignments or disorientation of the array in relation to the beam direction. In addition, the array system utilizes such electrical orientation and normalization as a base or reference upon which to "steer" the array electrically with directional selectivity in any one or more different receiving directions or transmitting directions, or both if desired, and in each direction receiving or transmitting independent modulation signals in the same operating range simultaneously. The invention is herein illustratively described for simplicity and convenience by reference to its presently preferred embodiment as applied to a linear type of array; however, it will be recognized by those skilled in the art that its use is readily extended to planar arrays since the elements of a planar array may be resolved into lines and columns of linear arrays and these phase-coordinated in the array-normalizing and directional control functions so as to impart maximum gain to the planar array through the combining of vector components (from the mutually transverse linear arrays) into resultants in any one or more directions about the planar array axis.

In the above-stated general objective, reference is made to the concept of orienting and normalizing an array electrically to a pilot signal. This concept, fundamental to a retrodirective array system is not new with the present invention. References of interest in this art include those cited of record in U.S. Pat. No. 3,305,864 Feb. 21, 1967) disclosing a steerable antenna communication system wherein retrodirectivity is achieved by conjugating the phase of the received RF pilot signal components in the antennas by mixing such components with an RF signal at double the frequency of the received signal and filtering out the difference RF signal product for reapplication to the antennas in order to transmit back to the pilot station. In that case, unlike conventional retrodirective array systems transmitting back only to the pilot station, it was suggested that transmitting beam direction could be varied at will by means of mechanically linked selectively variable phase shifters operating upon the RF signals being applied to the respective antennas of the array. However, the limitations and problems, such as bandwidth restrictions, inherent in coping with phase control, phase shift and phase lock functions at RF frequencies and other limitations of this reference technique upon the feasibility of constructing such array systems will be evident.

An object of this invention is to provide an improved retrodirective steerable array system and more particularly such a system having the capability of transmitting and receiving over a frequency range of 5 percent or more of the carrier or midfrequency.

A related object is to provide such a system which is capable of operating an antenna array at maximum gain in either or both the transmission mode and the reception mode and in one or more controlled beam directions simultaneously, with each such beam direction related to the direction of incidence of a pilot beam on the array.

More specifically it is an object of this invention to select or control, and vary if desired, the maximum gain direction of the array in one or more transmitting or receiving directions, or both, by controlling the phase of a monofrequency signal at IF level rather than at RF level. This invention thereby not only achieves the beam steering function in either or both transmission and reception but it avoids the circuit problems of managing phase shifts and energy transfer functions at the relatively high received and transmitted signal frequencies, and especially of so doing without having to accommodate the modulation signal band spread. In accordance with this invention controlled phase shifts necessary to steer or direct the antenna electrically are achieved by simple phase shift circuits of conventional narrow-band (i.e. monofrequency) relatively low-frequency (IF) types, thereby avoiding the necessity for utilizing relatively complex broadband high-frequency (RF) networks such as delay lines, etc.

A further objective hereof is to provide a system of the nature described which is also readily capable of normalizing the array to the direction of incidence of energy from the pilot station while enabling the system to extract and utilize modulation carried by the pilot beam alternatively or in addition to its potential multiple-beam steering function wherein it is operable to transmit and/or receive in adjacent bands in directions related to that of the pilot beam.

Another important concern of this invention is to provide a simplified and more practicable and reliable retrodirective and steerable array system wherein the respective antenna modules and sections thereof utilize circuits and elements in common and utilize monofrequency signals in all circuits wherein phase shift, phase control or phase-lock functions are performed. In addition, the invention utilizes an improved technique to conjugate the phase of the received pilot signals for retrodirective transmission in the pilot beam direction and in related but different directions by utilizing a common means for (1) generating local oscillations in each module carrying the conjugate phasing to which predetermined phase increments may be added in a mixing stage so as to control directional selectivity in transmission, and (2) generating local oscillations unconjugated in phase for heterodyning of the received pilot signal and other received signals for directionally selective reception by the array system.

In fulfillment of these and related objectives a feature of this invention is to provide in the array antenna modules means, including phase-lock loops and related antenna signal phase comparators by which the relative pilot signal phasings are transferred to a low-frequency reference signal and this signal in turn is mixed with a high-frequency reference signal to produce a receiver local oscillation which is the sum and a transmitter local oscillation which is the difference. The receiver local oscillation is utilized for heterodyning the received signals into IF signals in the respective modules which are co-phased, hence combinable additively. The transmitter local oscillations serve as the pilot signal phase conjugates which may be mixed with signals to be transmitted bearing predetermined graduated phase shifts in the successive modules corresponding to the electrical phasings of received signals in the antennas resulting from their spacings. Thus in the receiving mode and in the transmitting mode phase control is exercised at a relatively low-frequency level and by operating upon monofrequency signals, avoiding any problems of RF bandwidth design problems in the system. Additional features reside in the added phase-shift and mixer circuits, for transmission and reception modes in beam directions related to the pilot beam, combined in each module with the circuits producing receiver local oscillations and transmitter local oscillations common to all, and with use of the same low-frequency reference signal source as functioned in generating such local oscillations. As a result phase insertions establishing desired new directions of beam directivity are made at this reference frequency and in the process of adding them to the phase conjugate the reference frequency itself is eliminated from the resultant signal-modulated RF output. Moreover the same RF range is shared (indeed the same RF frequency of transmission or reception may be shared) simultaneously as are the frequency conversion and phase-controlling circuits by a plurality of beams each with different modulations, in both transmission and reception, inasmuch as the received energy signals from each beam are combined additively through precise phase correlation whereas the associated signal transmitted energy from the antennas for each beam mutually contribute to directional energy propagation also through precise phase correlation.

Antenna array systems of this invention have a wide variety of uses. These include various general-purpose electromagnetic wave energy applications in the arts of communications, object locating, position finding and related functions. For example, the invention may be employed as a communications relay system aboard a space satellite orbiting the earth. It may be used in radar stations or in source tracking or locating devices. Because of its automatic self-normalizing capability it may be used to great advantage in array structures the huge size of which requires automatic compensation for relative misalignments of antennas due to wind loads, structural sagging or temperature-induced strains. Another useful application for systems of this invention with their self-compensating function and multiple steerable beam capacity is in radio astronomy wherein the array antennas may be installed in less than perfect alignment or planar relationship on the side of a mountain or on a plain of the earth's surface and there function to locate, trace, or communicate with distant objects or energy sources.

An inherent advantage of such arrays in either case is the adaptive ability thereof to reject interference effects such as jamming signals from stations other than an intended station toward which the gain of the array is maximized. A further advantage lies in the ability of such arrays to disperse distortion components, and noise in directions other than the intended maximum gain direction of the array. The ability of the system to disperse some of the distortion and noise energy in directions other than the maximum gain direction of the array simplifies and further reduces the cost of the electronics.

These and other features, objects and advantages of the invention will become more fully evident from the following description by reference to the accompanying drawings.

Figure 5:
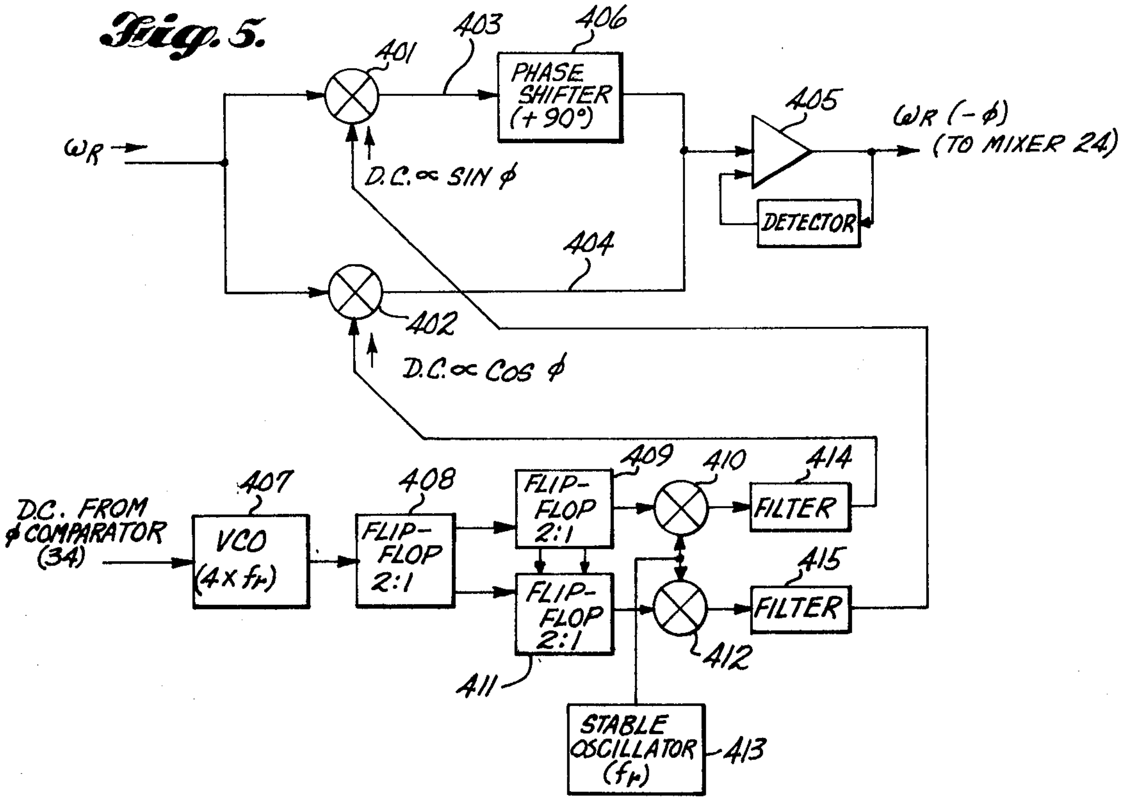

FIG. 5 diagrams a continuous phase shifter used herein.

Figure 1:
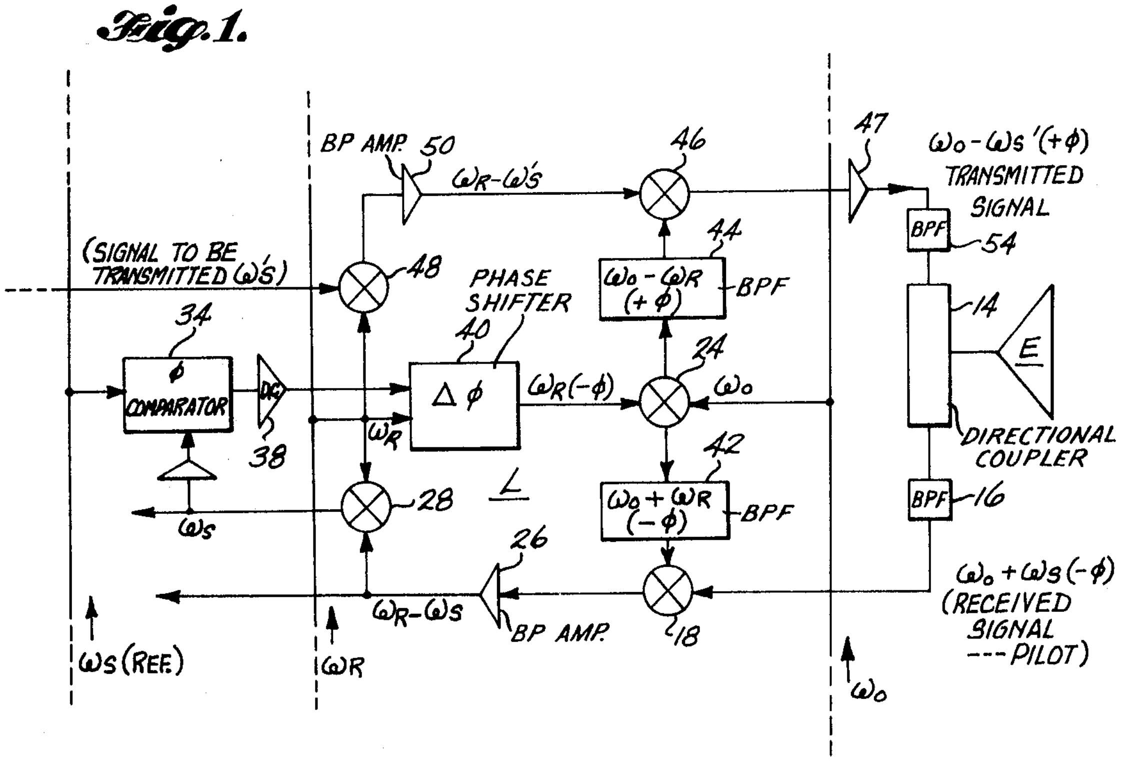
FIG. 1 illustrates part of one of the antenna modules in the system by which the array, in its retrodirective operating mode, is electrically phase-normalized and signals to be transmitted are phase-conjugated in relation to received pilot signals.

In FIG. 1 illustrating that portion of one antenna module by which the associated array is normalized to a pilot beam and made operable for retrodirective transmission, a phase-lock loop L receives a reference signal $\omega_S$ (Ref.) from one antenna module in the array, serving as a phase-reference. Signal $\omega_S$ (Ref.) is the reference antenna's pilot beam received signal reduced to video level (and usually converted to a noise-free monofrequency oscillation through use of a phase-lock oscillator, to be described). In addition, the phase-lock loop L receives a low-frequency reference signal $\omega_R$, a high-frequency reference signal $\omega_O$, and the received pilot signal $\omega_O+\omega_S(-\Phi)$ arriving at the antenna E associated with the module being described, such arrival occurring with an electrical phase-lag $\Phi$ behind the signal arriving at the reference antenna in accordance with the incidence angle of the pilot beam. In passing to the module input mixer 18, the received signal traverses a directional junction network 14 of well-known type which permits its passage freely from the antenna E to mixer 18 while preventing its passage into the transmitter side of the module, later to be described. A band-pass filter 16 of well-known type is interposed between input mixer 18 and network 14 so as to reject energy in other bands.

In mixer 18 the received pilot signal $\omega_O+\omega_S(-\Phi)$ is heterodyned by the output of a band-pass filter 42 containing a receiver local oscillation $\omega_O+\omega_R(-\Phi)$. One function of the phase-lock loop L is to develop this receiver local oscillation, whereby the received RF pilot signal is converted to an IF signal $\omega_R-\omega_S$, selected from the output of mixer 18 by the band-pass amplifier 26, and from which the video signal component $\omega_S$ may be extracted (in mixer 28) in cophased relationship with the input reference signal $\omega_S$(Ref.).

Mixer 28 beats the signal $\omega_R-\omega_S$ with the signal $\omega_R$ to produce the video output signal $\omega_S$. At this point in the circuit $\omega_S$ is properly phased to combine additively with its counterparts from other modules. In the phase-lock loop L the low-frequency reference signal $\omega_R$ is additionally utilized to extract the phase angle $\Phi$ from the input RF pilot signal $\omega_O+\omega_S(-\Phi)$. In so doing $\omega_R$ becomes $\omega_R(-\Phi)$, which serves as an array-normalizing signal. The manner in which these operations are accomplished will now be described.

In the phase-lock loop L, in order to transfer the phase angle $\Phi$ from the received RF pilot signal to a low-frequency array-normalizing signal $\omega_R(-\Phi)$ it is first necessary to compare the phase of the received pilot signal in the particular antenna module with the phase of the received pilot signal ($\omega_S$ (Ref.)) in the reference antenna module. In order to make this comparison the output of mixer 28 and the phase reference signal $\omega_S$ (Ref.) are applied to phase comparator 34 in order to derive a DC voltage proportional to the cosine of the phase difference between them, which voltage is amplified in the DC amplifier 38. The output of DC amplifier 38 is a phase-control voltage which, in equilibrium conditions in the phase-lock loop, attains a value close to zero. In phase shifter 40, this voltage controls the rate of phase shift so that in equilibrium conditions (zero volts, phase shift rate equals zero) the phase of the applied low-frequency reference signal $\omega_R$ is shifted by the appropriate amount to convert $\omega_R$ into the desired low-frequency array-normalizing signal $\omega_R(-\Phi)$. This latter signal, along with a high-frequency reference signal $\omega_O$ applied to mixer 24 produces the receiver local oscillation signal $\omega_O+\omega_R(-\Phi)$ selected by band-pass filter 42 for application to input mixer 18. The phase-lock loop L, including the components just described, functions as a servo loop in such a manner that the phase comparator 34 continues to produce a change in phase-correction DC voltage being applied to phase shifter 40 as long as a phase difference other than 90° remains between the phase comparator input signals $\omega_S$ and $\omega_S$ (Ref.). The polarity of the DC voltage thus produced further alters the phase shift imparted to $\omega_R$ by the phase shifter 40 in the proper sense to reduce the phase difference between $\omega_S$ and $\omega_S$ (Ref.). When the latter phase difference is reduced to 90° the DC voltage produced by comparator 34 undergoes no further change and the system is in phase equilibrium. In equilibrium, the video signal $\omega_S$ carried in the IF signal $\omega_R-\omega_S$, from amplifier 26 is phase-normalized to the reference module in the array. By similarly phase-normalizing the received RF pilot signals in all other antenna modules in the array with relation to the reference module, the resultant video signals $\omega_S$ from these modules are combinable additively so as to afford maximum gain or sensitivity of the antenna array to the received pilot signal.

By thus electrically normalizing the array through the step of creating a receiver local oscillation signal $\omega_O+\omega_R(-\Phi)$ in each module which carries the necessary inherent electrical phase correction accounting for antenna misalignments in the array, and array angularity to the direction of incidence of the pilot beam energy, the array modules are inherently conditioned in accordance with this invention to operate the array system with maximum receiving gain sensitivity and maximum transmitting gain sensitivity in one or more other directions, related to the direction of incidence of the pilot beam. This is carried out by an electrical phase-control technique hereinafter described. Moreover, these additional transmitting and receiving functions may be performed simultaneously in the same RF band even though the different beams or maximum gain directions of the array carry individual RF signals independently modulated. By a phase correlating technique built upon the array-normalizing and conjugating functions these independent signal modulations are permitted to traverse the same circuits and antennas simultaneously, carried in the same RF and IF bands, yet are separated from each other in receiving circuits as they are in the different paths they travel to or from the array.

An additional aspect of the retrodirective array module shown in FIG. 1 is the utilization of the output of mixer 24 not only to generate a receiver local oscillation $\omega_O+\omega_R(-\Phi)$ containing the desired phase-normalizing reference component, but also a transmitter local oscillation ($\omega_O-\omega_R(+\Phi)$) inherently containing the desired phase conjugate component for purposes of directional control in transmission relative to the received pilot beam. Thus band-pass filter 44 is designed to select the difference product $\omega_O-\omega_R(+\Phi)$ of this mixing function, which difference product is applied to output mixer 46 together with a signal $\omega_R-\omega'_S$ developed in band-pass amplifier 50 from the product of mixing in mixer 48 of the low-frequency signal $\omega_R$ and a signal $\omega'_S$ to be transmitted.

Amplifier 47 in the output of mixer 46 then delivers the transmitted signal $\omega_R-\omega'_S(+\Phi)$ for application through band-pass filter 54 and junction network 14 to the antenna E. The unidirectional characteristic of network 14 protects the receiver side of the module from overload by the high level of energy in transmission. The frequency selectivity of filter 16, tuned for $\omega_O+\omega_S$, is also effective to help exclude transmission energy, at slightly different frequency $\omega_O-\omega'_S$, from the receiver circuits. By thus energizing the array antennas with transmitted signals phase-conjugated in relation to their respective received filter signals the antenna radiations will combine with maximum gain from the array in the original direction of incidence of the received pilot beam so as to transmit energy with maximum directionality back to the pilot station.

While the ability of a retrodirective array to transmit energy back along the original path of reception is not new, the present technique for so doing is considered to represent an important advance, particularly in its provision of means for achieving the related objectives referred to herein. In this regard it will become evident that the step in each module of generating the receiver and transmitter local oscillations not only provides phase normalization of the array for all desired receiving directions but provides normalized phase conjugation of the array for transmitting with maximum gain in desired transmitting directions. It will also be evident that a maximum number of functions are thereby performed with a minimum number of components serving multiple duty and that the commonality of reference signal sources low-frequency circuits controlling, shifting and locking phase of the various signals assures highly predictable and reliable directional control of the array system.

Figure 2:
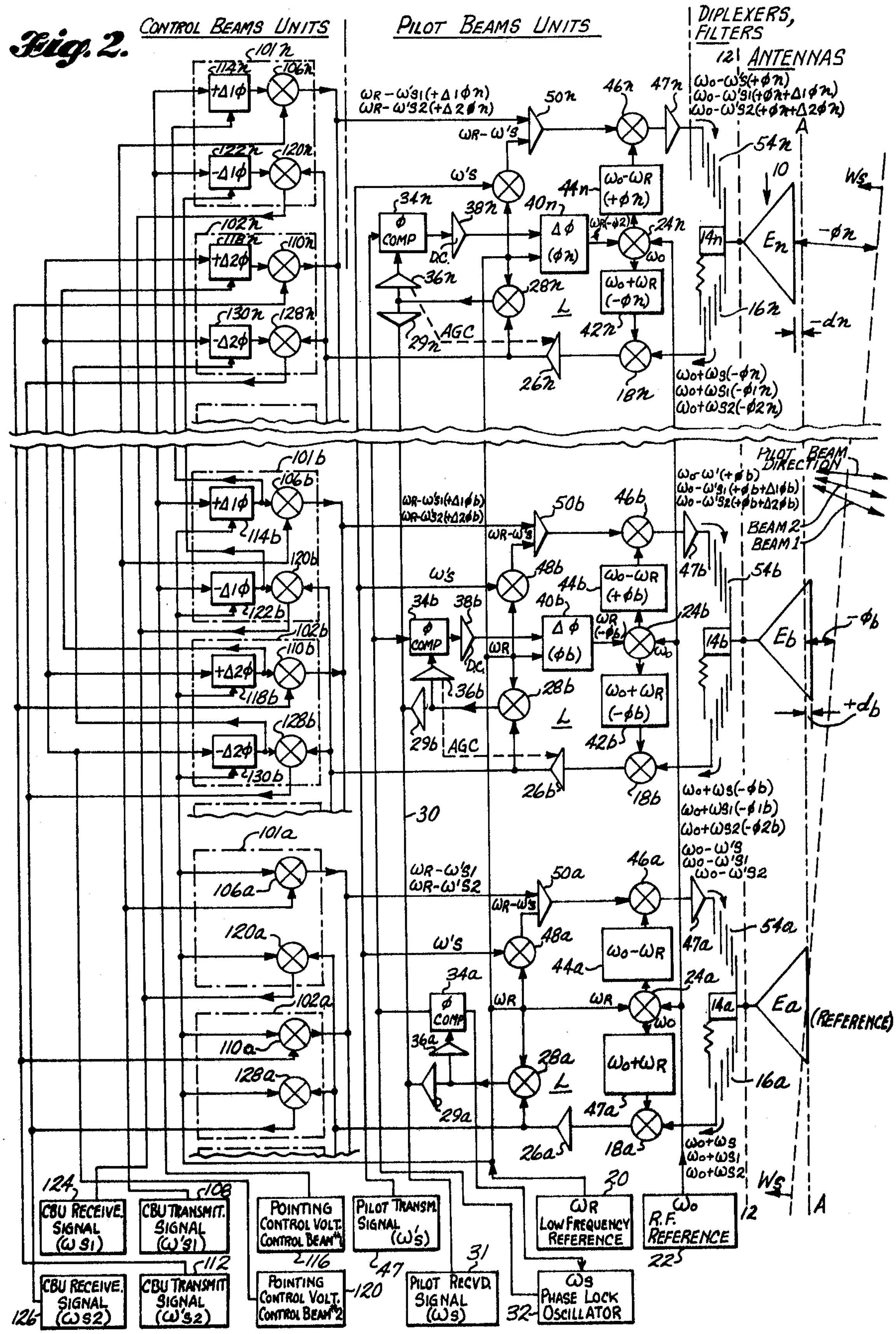
FIG. 2 is a block diagram of a linear array system embodying the invention.

In the array system of FIG. 2 antenna array 10 comprises a series of radiative antenna elements $E_a$, $E_b$,–$E_n$ of which there may be any desired number. Typically, these elements are arranged in substantially a straight line A—A with successive elements spaced apart by an electrical distance for maximum gain in broadside operation and minimum side-lobe losses at the operating frequency band chosen. The individual radiative elements may comprise dipoles, helices, radiative slots or other suitable radiator elements or combinations of elements appropriate to the particular application. The array elements have a common physical support symbolized by the broken line 12 maintaining their positional relationship with each other.

In practice it is not always possible to establish and maintain perfect alignment of the elements of a linear array. In a conventional array, to the extent the antennas become misaligned, the gain of the array may be materially decreased or the direction of its maximum gain shifted. Physical strain in the structural support of a very large array due to wind loads, gravitational forces, or temperature effects can produce serious and unpredictable inaccuracies. The phase-normalizing function of a retrodirective array is effective to compensate for these distortions and it is this established principle which has been used as the point of beginning for the present invention. For example, in the drawing array element $E_n$ is assumed to be offset by an amount $-d$nfrom the intended array line A—A in the negative or rearward sense whereas array element $E_b$ is assumed to be offset by an amount $+d$b. Element $E_a$ is assumed to be in proper position. Thus an electrical wave front $W_s$—$W_s$ representing a remote pilot station transmitted beam incident on the array arrives at the antennas at intervals or phasings related to incidence angle and relative offsets of the antennas. Thus the wave front reaches element $E_b$ sooner and element $E_n$ later than the anticipated instants as a result of the described offsets or misalignment of these elements. The received pilot beam signals in the successive antenna modules *a,b,n* may thus be represented: $\omega_o+\omega_s$, $\omega_o+\omega_s(-\Phi_b)$,-GOz GS$(-\Phi_n)$, with their relative electrical phase angles being designated $\Phi_b$,–*B*n corresponding to incident wave front phasing at the antennas. Thus in order for these received signals to be additively combinable (to a maximum total) it is necessary to eliminate these phase differences, i.e. to normalize the array electrically, as if the wave front $W_s$—$W_s$ were indeed perpendicularly incident on an array of perfectly aligned antennas. The manner in which the signal received in one module is converted in phase for the phase-normalizing function was described above in connection with FIG. 1 and the manner in which this relates to normalizing the entire array will now be discussed with reference to FIG. 2, wherein module components corresponding to those shown in FIG. 1 are similarly designated with appropriate subscripts to indicate the particular module.

The received pilot beam signal $\omega_O+\omega_S$ in reference element $E_a$ passes through a diplexer 14*a* (i.e. directional junction network). From the diplexer the received energy passes through a band-pass network 16*a* to the input mixer 18*a*. The module for antenna element $E_b$ has a correspondingly numbered diplexer, band-pass filter and mixer as do each of the other antenna element modules. As already described in connection with FIG. 1, the receiving channel mixer 18 in each antenna module converts the received pilot signal $\omega_O+\omega_S$, $\omega_O+\omega_S(-\Phi_b)$,–GOz GS$(-\Phi_n)$ into corresponding IF frequency signals $\omega_R-\omega_S$, $\omega_R-\omega_S(-\Phi_b)$,–GR*l*GS$(-\Phi_n)$ by beating such received signals against the respective receiver local oscillations $\omega_O+\omega_R$ $\omega_R(\Phi_b)$,–GOzGR$(-\Phi_n)$. These local oscillations are generated in mixers 24*a*, 24*b*,–24*n* in the manner already described by mixing the high- and low-frequency signals $\omega_o$ and $\omega_R$ from the respective reference sources 20 and 22, with signals $\omega_R$ phase-shifted in the respective phase-lock loops to extract the phasings of the module received signals relative to the reference module received signals. The desired co-phased video signals $\omega_S$ are then derived by amplifying the resultant IF signals $\omega_R-\omega_S$ in the respective band-pass amplifiers 26*a*, 26*b*–26*n* before application to the mixers 28*a*, 28*b*–28*n* wherein they are mixed with the low-frequency reference signal $\omega_R$ to produce the received signals $\omega_S$. These received signals, thus phase-normalized, are then applied through amplifiers 29*a*, 29*b*,–29*n* to a common conductor 30 wherein they combine additively for application to any utilization means 31.

In the process of normalizing the array to the approaching wave front and thereby compensating for misalignment of the array antennas it is desirable to employ a clean or noise-free phase reference signal $\omega_S$ from the reference antenna $E_a$. To derive such a reference signal the video signal $\omega_S$ from the receiver circuit of antenna element $E_a$, amplified in unit 36*a*, is applied to phase comparator 34*a* which also receives a signal from and in turn controls a voltage-controlled phase-lock oscillator 32 of a well-known type. Oscillator 32 is designed to oscillate substantially at frequency $\omega_S$ and is pulled into phase lock with input signal $\omega_S$ so as to produce a strong and clean output signal $\omega_S$ (Ref.) for application to the antenna modules where its phase is compared in each of comparators 34*b*,–34*n* with the phases of the respective received signals $\omega_S$ delivered by mixers 28*b*–28*n* after amplification in band-pass amplifiers 36*b*–36*n*. As described in connection with FIG. 1, phase comparators 34*b*–34*n* produce DC voltages which drive their respective phase shifters 40 *b*–40*n* until the DC voltages from the phase comparators null (zero volts or 90° phase difference, as later described in conjunction with FIG. 5). This performs the phase-normalizing function of the phase-lock loop.

In performing the receiver phase-normalizing function mixers 24*a*, 24*b*,–24*n* also produce respective products representing the differences between $\omega_O$ and $\omega_R$, $\omega_R(-\Phi_b)$,–$\omega_R(-\omega_n)$, wherein the phase shift occurs in the opposite or conjugate sense from that in the receiver phase-lock loop L. Band-pass filters 44*a*, 44*b*–44*n* in the respective modules selectively pass these difference products $\omega_O-\omega_R$, $\omega_O-\omega_R(+\Phi_b)$,–$\omega_O-\omega_R(+\Phi_n)$ to transmitting mixers 46*a*, 46*b*–46*n* wherein they are beat against the IF conversion of a signal to be transmitted $\omega_S'$. These IF conversion signals $\omega_R-\omega_S'$ are generated in mixers 48*a*, 48*b*–48*n*, by beating $\omega_R$ against $\omega_S'$, and amplified in the respective amplifiers 50*a*, 50*b*–50*n*.

Thus with the transmitted signals $\omega_0-\omega_S'$, $\omega_0-\omega_S'(+\Phi_b)$,–$\omega_0-\omega_S'(+\Phi_n)$ thus purely phase-conjugated in relation to the prior beam received signals picked up by the antennas, a directional transmitted beam is produced by the array substantially along the propagation path of the incident pilot beam represented by the pilot wave front $W_s$—$W_s$. The illustration in FIG. 1 and the description thus far with reference to FIG. 2 have dealt primarily with array normalization and phase conjugation in relation to the pilot beam, represented by incident wave front $W_s$—$W_s$. It was explained how the low-frequency normalizing signal $\omega_R(-\Phi)$ in each module is mixed with high-frequency reference signal $\omega_0$ to form both a summation product or receiver local oscillation $\omega_0+\omega_R(-\Phi)$ and a difference product or transmitted local oscillation $\omega_0-\omega_R(+\Phi)$. It will be clear from these relationships that by transferring the phase relationships of the antenna received signals to a low-frequency reference and then controlling array phasing for the normalizing function at low frequency and with a monofrequency signal ($\omega_R$) these functions are executed readily and with precision in simple circuit apparatus. In accordance with this invention additional receiving and transmitting directional beams are formed through these same antennas and module circuits with the simple addition of separate phase modifying circuits for each. Thus maximum utilization of the array system for the transmission and reception of intelligence in the same band is achieved by forming multiple beams of the same frequency but, through a process of phase control, of directional diversity. The means to accomplish this result will now be described.

In FIG. 2 each antenna module has associated with it one or more transmit-receive control beam units, 101,102–, the number depending upon the number of beams, in addition to the pilot beam, to be formed with the array. In FIG. 2 these units are designated with subscripts *a*, *b*–*n* to identify the modules with which they are associated. Control beam unit 101*a*, has a mixer 106*a* which mixes the signal to be transmitted, $\omega_{S1}'$, out of source 108, with $\omega_R$ from reference source 20 to produce a difference product $\omega_R-\omega_{S1}'$ which is selected for application to transmit mixer 46*a* by band-pass amplifier 50*a*. In like manner unit 102*a* has a mixer 110*a* producing the difference product of $\omega_R$ and transmit signal $\omega_{S2}'$ from source 112. This likewise passes amplifier 50*a*. These and any other transmit signal difference products $\omega_R-\omega_{S1}'$, $\omega_R-\omega_S'$,–are thereby mixed with transmitter local oscillation $\omega_0-\omega_R$ in mixer 46*a* to produce transmitted output signals $\omega_0-\omega_{S1}'$, $\omega_0-\omega_{S2}'$,–along with any pilot beam transmitted signal $\omega_0-\omega_{S1}'$, and in the band of the latter, since preferably the control frequency of $\omega_S'$ is the same as that of $\omega_{S1}'$, $\omega_{S2}'$,–. Since E*a* is the array reference antenna no added phase shift is applied to the signals generated in modules 101*a*, 102*a*–. However in unit 101*b* low-frequency reference $\omega_R$ is phase-shifted by a predetermined amount ($+\Delta 1\Phi$) in phase shifter 114*b* set by a selected control voltage from a pointing control 116 for beam number 1 before such $\omega_R$ reaches the mixer 106*b*, which corresponds to mixer 106*a*, to be mixed with $\omega_{S1}'$ from source 108. A similar phase shifter 118*b* in unit 102*b* imparts a predetermined different amount of phase shift ($+\Delta 2\Phi$) to $\omega_R$ set by control voltage from pointing control 120 for beam number 2, before such $\omega_R$ passes reaches mixer 110*b*, which corresponds to mixer 110*a*, to be mixed with $\omega_{S2}'$ from source 112. In unit 101*n* there is a phase shifter 114*n* and mixer 106*n* corresponding to phase shifter 114*b* and mixer 106*b* in unit 101*b*, and a phase shifter 118*n* and mixer 110*n* corresponding to phase shifter 118*b* and mixer 110*b* in unit 101*b*. However, the low-frequency reference $\omega_R$ applied to mixer 114*n* is not taken directly from source 20, but is taken from the output of the phase shifter 114 in the last preceding module after having undergone a cumulative phase shift by equal increments ($+\Delta 1\Phi$) progressively in the successive modules 101*b*–101*n*–1 leading up to it. In mixer 114*n* one further and equal increment ($+\Delta 1\Phi$) is added before the resultant $\omega_R$ reaches mixer 106*n*. The same thing happens to $\omega_R$ before reaching mixer 110*n* by way of phase shifter 118*n*. Consequently the signals to be transmitted respectively in the numbers 1 and 2 beam directions ($\omega_{S1}'$ and $\omega_{S2}'$) through the successive antennas of the array are mixed with reference signals $\omega_R$ which are phase-shifted by predetermined amounts different for each beam, graduated incrementally along the array, before being mixed with the phase-conjugated transmitter local oscillation from filters 44*a*, 44*b*,–44*n* in the respective modules. Thus the array transmits the signal $\omega_{S1}'$ at a midfrequency $\omega_0-\omega_S'$ with maximum gain in a selected direction (i.e. beam 1) by energizing the antennas E*a*, E*b*,–E*n* with the respective signals $\omega_0-\omega_{S1}'$, $_0-\omega'_{S1}(+\Delta 1\Phi b)$–$\omega_0-\omega_{S1}'(+\Delta 1\Phi n)$ where $\Delta 1\Phi b$ is equal to $\Delta 1\Phi$ and where $\Delta 1\Phi n$ is equal to $(n-1)$ times $\Delta 1\Phi$, in terms of phase angle. This beam direction will be related to but will differ from the incident pilot beam direction, the difference being determined by the phase increment $\Delta 1\Phi$. Likewise signal $\omega_{S2}'$ will be beamed in a second new direction differing from but related to the pilot beam direction, the difference being determined by the phase increment $\Delta 2\Phi$. These sets of transmitted signals and still others with other intended directions of propagation may be formed and transmitted simultaneously at substantially the same midfrequency, and each signal therefore effectively concentrated in a distinct direction independently of the others.

Receiving beam control of the antenna array is similarly accomplished. Each control beam unit may also incorporate a means employing phase separation of received signals in the respective antenna modules in order to sort out the modulation or received signals from propagative wave energy incident on the array in each of a plurality of different beam directions simultaneously and at substantially the same midfrequency. In the example shown in FIG. 1 the receiver circuits are arranged so that the array system will receive with maximum gain in each beam direction in which it will transmit with maximum gain. However, this equality of treatment in numbers of transmission paths and reception paths is not essential, nor is it essential, therefore, that the particular reception path coincide with or even directly relate to a particular transmission path. In the example, however, control beam unit 101*a* includes a mixer 120*a* for $\omega_R$ and the received IF signals out of mixer 18*a* and amplifier 26*a*. Units 101*b*,–101*n* have similar mixers 120*b*,–120*n* correspondingly associated with their respective antenna modules, except the $\omega_R$ which reaches these latter mixers does so after undergoing phase shifts $-\Delta 1\Phi$,–$-(n-1)\,\Delta 1\Phi$ as a result of cumulative incremental phase shifts occurring in the successive phase shifters 122*b*,–122*bn*. The outputs of mixers 120*a*, 120*b*–120*n* are combined in control beam unit receiver circuit 124, and because of phase control voltage from pointing control 116 the signals (i.e. $\omega_0+\omega_{S1}$, $\omega_0+\omega_{S1}(-\Phi 1b)$,–$\omega_0+\omega_{S1}(-\Phi 1n)$) associated with a particular beam direction (Beam 1) will be co-phased and will add up with maximum effect and thus stand out prominently among all other signals, even those in the same band which are incident on the array from other directions. Likewise in order to deliver co-phased signals to control beam unit receiver circuit 126 from received energy in the Beam 2 direction control beam units 102*a*, 102*b*–102*n* have mixers 128*a*, 128*b*,–128*n*; and $\omega_R$ in reaching mixers 128*b*,–128*n* is phase shifted cumulatively by increments (set as to amount by pointing control 120) in the succession of phase shifters 130*b*,–130*n*, just as in the case of the transmitted beam pointing function. However, the phase shifts imparted in the control beam units for the receiving function are required to be opposite those required for the transmitting function, just as pilot beam transmission required phase conjugation of pilot beam reception signals.

Figure 4:
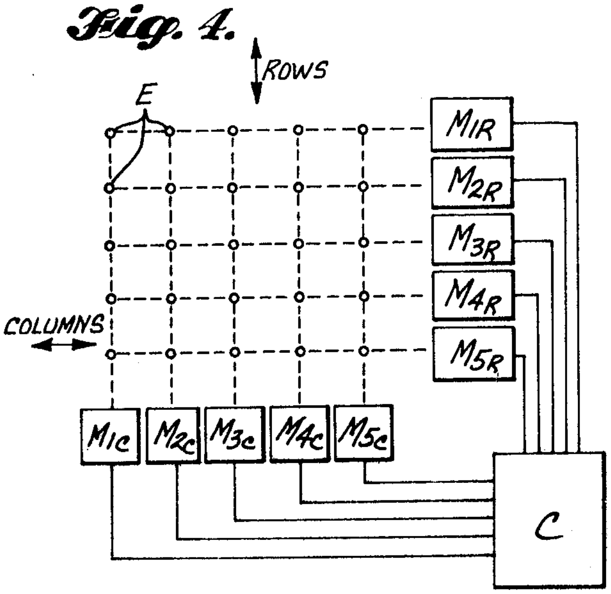
FIG. 4 is a simplified diagram indicating a three-dimensional application of the invention.

In the diagram of FIG. 4 the rows and columns of antennas E making up a planar array are illustrated. Each row of antennas may be regarded as a linear array comparable to that shown in FIG. 2, and each column the same. Phase control receiving and transmitting modules $M_{1R}$, $M_{2R}$–connect with the respective row arrays and similar modules with the respective column arrays, the modules being jointly controlled by a central computer system C. Assuming a pilot beam wave front incident on the planar array on a plane perpendicular to the plane of the paper and parallel with the rows, the row modules $M_{1R}$, $M_{2R}$, etc. would function as the modules in FIG. 2, and correspondingly located elements in the respective rows would be similarly phased. The same effect applies to the column modules in the event of a received wave front propagating into incidence with the array in a plane perpendicular to the plane of the paper and parallel with the column. A wave incident in some other direction will activate both sets of modules so as to resolve the relative phase angles of the received signals vectorially into column and row components. The central computer is intended to contain the appropriate reference signal sources, pointing control circuits, transmitter signal sources and controls, signal receiver circuits and means to produce the necessary phase vector components for the rows and columns to achieve directionality of the array in any desired resultant pointing direction.

Figure 3:
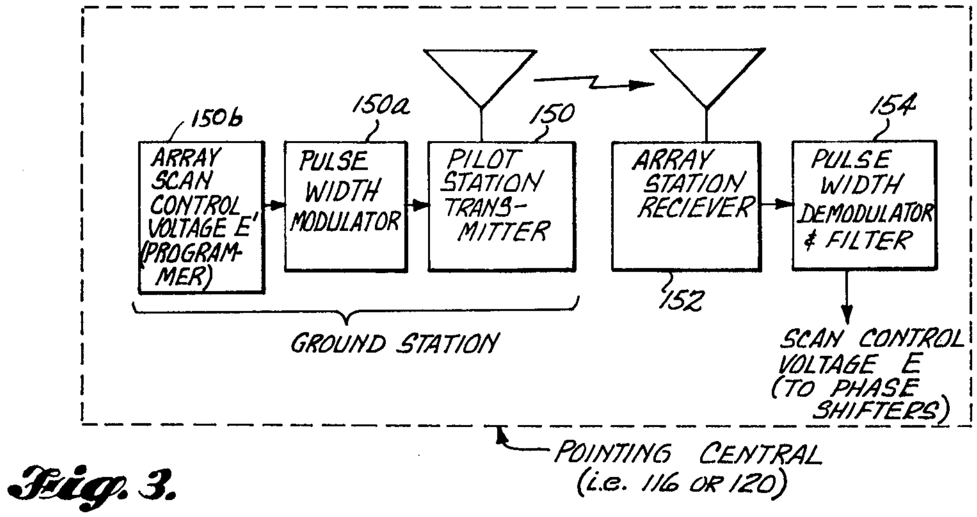
FIG. 3 is a diagram illustrating a suitable remotely controlled means for varying beam direction in the system.

Should noise or distortion effects occur in the transmitter circuits producing cross-modulation products between separate beams, these will go off in different directions so as to be practically unnoticed at the remote receiving station in the intended beam path. Likewise should it be desired to vary or scan any transmitter beam, this may be done by incorporating any suitable means for varying the beam control voltage in one of the pointing controls, such as 116 or 120. An example of a means to scan the array beam is shown in FIG. 3, wherein a pulse width modulation produced and controlled on the ground is passed through a low-pass filter to produce a voltage.

As shown in this figure the pilot transmitter 150 is pulse-width modulated by the modulator **150*a* responsive to a source 150*b* of array scan control voltage E′ which may be preprogrammed by a computer or otherwise generated to satisfy any required scan or pointing control function. At the array station the pulse-width modulated pilot signal is received in a unit 152 and demodulated and filtered in a unit 154 so as to recover the desired scan control voltage E, which is then applied to a pointing control unit such as 116 or 120** in the array control system. Independent (or related) similar control may be exercised with respect to each of the pointing control units in the system.

It will further be evident that retransmission of received signals from any beam path may be directed along any other beam path, for example, by applying the received signal to the appropriate sets of mixers, such as **48*a*,–48*n*, or 106*a*, Ω*b*,–106*n*, or 110*a*, 110*b*,–110*n***.

While various phase shifter systems may be employed for the units **40*b*, 40*c*–40*n*, it is preferred to employ a continuous type phase shifter in order to avoid the transients in phase shifts that would occur with the "fly back" action of a cyclic type of shifter each time it reaches the limit of its phase shift range. The preferred continuous phase shifter system for this purpose is diagrammed in FIG. 5. In this figure the input wave $\omega_R$ is applied to mixers 401 and 402 in parallel circuit channels 403 and 404. A fixed 90° phase shifter 406 is incorporated in channel 403 so as to shift the output signal from mixer 401 by 90° before it is combined in the input of amplifier 405 with the output signal from mixer 402 in channel 404. The function of mixer 401 is to multiply signal $\omega_R$ (expressed as cos $\omega t$) by a direct voltage proportional to sin Φ. The function of mixer 402 is to multiply signal $\omega_R$ by a direct voltage proportional to cos Φ. Thus the output of channel 403 (after phase shifter 406) becomes $-\sin\Phi \sin \omega t$ and the output of channel 404 becomes $\cos\Phi \cos \omega t$. Summed together in the input of amplifier 405**, these channel outputs combine to produce $\cos(\omega t+\Phi)$, as desired, where Φ is the required phase shift.

In order to produce DC voltages proportional to sin Φ and cos Φ respectively a DC control voltage from the phase comparator 34 is applied to voltage controlled oscillator 407 operating at a midfrequency of $4fr$, at which frequency it operates with zero input voltage. This zero input condition is obtained when the phase error or difference between $\omega_S$ (Ref.) and $\omega_S$ applied to the phase comparator 34 is 90°. The output of oscillator 407 is frequency divided by two in a flip-flop 408, which incidentally produces a wave with time-symmetrical positive and negative half cycles.

The output of flip-flop 408 is frequency divided by two in flip-flop 409 and applied to one side of mixer 410. The output of flip-flop 408 is also divided by flip-flop 411 and applied to one side of mixer 412. Flip-flops 409 and 411 are triggered from flip-flop 408 and are themselves relatively phased by the indicated phase correlating connections in well known manner assuring that the output wave of flip-flop 409 is related to the output of flip-flop 411 as the sine is related to the cosine of their common output frequency. To do this flip-flop 409 is triggered by the rising transients of the wave form from flip-flop 408 whereas flip-flop 411 is triggered by the falling transients of the wave form from flip-flop 408. The output of stable local oscillator 413 at frequency $fr$ (such as 10 kHz.) is applied to the remaining side of each of mixers 410 and 412 thereby yielding DC voltages respectively proportional to the cosine and sine of the desired phase shift Φ, filtered to eliminate the signal $2fr$ in filters 414 and 415 before application to the respective mixers 402 and 401.

These and other aspects of the invention will be evident to those skilled in the art based on the foregoing illustrations and description of the preferred embodiment.

We claim:

1. In a communication system comprising a plurality of antenna modules with respective antennas mounted in an array for reception of a high-frequency wave from a remote point to produce respective high-frequency received signals relatively phased in accordance with the spacings between the antennas and the direction of wave incidence on the array, a source of reference signal $\omega_R$ of relatively low frequency applied to the modules, phase shifter means in all but one module utilizing the respective phase differences between the high-frequency signal in said one module, as a phase reference, and the high-frequency received signals in such other modules to convert said reference signal in said other modules into respective relatively low-frequency array normalizing signals $\omega_R$ (Φ) of relative phasings corresponding to the relative phasings of the respective high-frequency received signals therein, one or more sets of receiving converter means with each set having a converter means in each of the modules utilizing the respective module-normalizing signals for converting into one or more output signals from each module each of the one or more high-frequency received signals produced in such modules by incidence of waves on the array from one or more remote points located in different directions from the array, those output signals associated with the high-frequency received signals from each such remote point being co-phased and combinable additively, and being differently phased from those output signals associated with the high-frequency signals from a different remote point, including beam control means providing to the converter means of at least one set thereof respective antenna beam steering signals of relatively low frequency which, within said set, are phase shifted by predetermined amounts graduated along the array in accordance with the high-frequency received signal phase differences resulting from spacings between the array antennas, and means combining the outputs from each of converter means.

2. The combination defined in claim 1, further comprising one or more sources of signal to be transmitted by the array in respectively different directions differing from but related to the first-mentioned direction of wave incidence on the array, means in the respective antenna modules applying predetermined increments of phase shift to each of the respective transmission signals, which increments are graduated along the array in accordance with phase differences resulting from spacings between the antennas, and one or more sets of transmission converter means with each set having a converter means in each of the modules utilizing the phase conjugates of the respective module-normalizing signals and the phase-shifted transmission signals for producing antenna energizing signals in each antenna the phasing of which includes the conjugate of the high-frequency received signals and the phase shift increments added thereto.

3. The combination defined in claim 2 wherein the sets of receiving converter means and high-frequency converter means include therein a source of high-frequency reference signal $\omega_0$, wherein the receiving converter means include means to form and mix the sums of such high-frequency reference signal $\omega_0$ and the respective module-normalizing signals with the high-frequency received signals $\omega_0+\omega_S$ so as to produce respective sums $\omega_R-\omega_S$, means to mix the relatively low-frequency reference signal $\omega_R$ with the sums $\omega_R-\omega_S$ to produce output video signals $\omega_S$, means including a phase-lock loop in the respective modules to compare the phases of $\omega_S$ therein with the phase of $\omega_S$ from a single module as a phase reference, and means responsive to such phase comparison means to shift the phase of such low-frequency reference signal accordingly to produce respective normalizing signals $\omega_R(\Phi)$; and wherein each transmission converter means includes means producing the difference frequency $\omega_0-\omega_R(\Phi)$, and means mixing such difference frequency with the respective signals to be transmitted.

4. In a retrodirective type antenna array system, means to extract the phase of high-frequency received signals in the array antennas, comprising means reducing the frequency of said signals correspondingly while eliminating their relative phase differences due to antenna spacings in the array, said means including a source of reference signal of relatively low frequency, and a plurality of converter means, connected with respective antennas, utilizing such reference signal and the phase differences between the received signal in one antenna and those in said respective antennas to generate relatively low-frequency normalizing signals for said respective antennas related in phase similarly to the phase relationship between received signals in such antennas, means controlling directional transmission from the array in a direction related to the direction of wave incidence on the array producing the received signals, including a source of reference signal of relatively high frequency, a plurality of converter means connected with the respective antennas utilizing their associated normalizing signals and said high-frequency signal to produce individual local oscillations for each antenna at a new frequency conjugated in phase relative to the respective received signals, a source of at least one information signal to be transmitted through the array in a direction other than said direction of incidence, a plurality of phase shifter means associated with respective antennas in the array to apply phase shifts to said information signal for the respective antennas of predetermined amounts graduated along the array in accordance with phase differences resulting from spacings between the antennas, and means controlling relative ultimate electrical phasing of the antennas in transmission utilizing both the respective individual local oscillations for such antennas and the information signal with the respectively applied phase shifts thereof for such antennas.

5. The combination defined in claim 4 in which the phase shifter means includes means operable to apply phase shift to the information signal by first shifting the phase of the reference signal of relatively low frequency then mixing the same with the information signal.

6. In a retrodirective type antenna array system, means to extract the phase of high-frequency received signals in the array antennas, comprising means reducing the frequency of said signals correspondingly while eliminating their relative phase differences due to antenna spacings in the array, said means including a source of reference signal of relatively low frequency, and a plurality of converter means, connected with respective antennas, utilizing such reference signal and the phase differences between the received signal in one antenna and those in said respective antennas to generate relatively low-frequency normalizing signals for said respective antennas related in phase similarly to the phase relationship between received signals in such antennas, means controlling directional transmission from the array in a direction related to the direction of wave incidence on the array producing the received signals, including a source of reference signal of relatively high frequency, a plurality of converter means connected with the respective antennas utilizing their associated normalizing signals and said high-frequency signal to produce individual local oscillations for each antenna at a new frequency conjugated in phase relative to the respective received signals, a plurality of sources of information signals to be transmitted through the array in respectively different directions related to but differing from said direction of incidence, a plurality of sets of phase shifter means operating respectively upon the plurality of information signals, each set applying to one information signal predetermined amounts of phase shift graduated along the array in accordance with phase differences resulting from spacings between the antennas, with said predetermined amounts of phase shift applied by one set differing from those applied by another set.

7. In a retrodirective type antenna array system, means to extract the phase of high-frequency received signals in the array antennas, comprising means reducing the frequency of said signals correspondingly while eliminating their relative phase differences due to antenna spacings in the array, said means including a source of reference signal of relatively low frequency, and a plurality of converter means, connected with respective antennas, utilizing such reference signal and the phase differences between the received signal in one antenna and those in said respective antennas to generate relatively low-frequency normalizing signals for said respective antennas related in phase similarly to the phase relationship between received signals in such antennas, means controlling directional transmission and reception from the array in at least one direction related to but differing from the direction of wave incidence on the array-producing said received signals, including a source of reference signal of relatively high frequency, a plurality of converter means associated with respective antennas and mixing said high-frequency reference signal with the normalizing signals associated with the respective antennas to produce local oscillations for each antenna, one according to the sum frequency and other according to the difference frequency of said mixing, with one such local oscillation for each antenna being conjugated in phase relative to the respective received signal in such antenna, and means utilizing such conjugate local oscillations to control the relative phasings of their respective antennas in transmission while utilizing the other local oscillations resulting from said mixing for mixing, in turn, with the respective high-frequency received signals in the generation of the associated relatively low-frequency normalizing signals.

8. The combination defined in claim 7, further comprising at least one source of information signal to be transmitted through the array in a transmitting direction other than said direction of incidence, and at least one device for receiving the combined relatively high-frequency signals from a wave incident on the array in a receiving direction other than said first-mentioned direction of incidence, a plurality of phase shifter means associated with respective antennas in the array to apply a phase shift to said information signal for such antennas of predetermined amounts graduated along the array in accordance with the phase differences resulting from spacings between the antennas, means controlling relative ultimate phasing of the antennas in transmission utilizing both the respective individual phase-conjugate local oscillations for such antennas and the information signal with the respectively applied phase shifts thereof for such antennas, and means combining the other local oscillations of the respective antennas for application to said receiving device, including means applying phase shifts to said latter local oscillations associated with the respective antennas of predetermined amounts graduated along the array in accordance with phase differences resulting from spacings between the antennas and corresponding to said receiving direction.

9. An antenna system comprising an array of antennas for receiving a pilot beam signal $\omega_O+\omega_S$ from a remote station, a single source of low-frequency reference signal $\omega_R$, a single source of high-frequency reference signal $\omega_O$, primary converter means connected with said sources and one of said antennas and utilizing said received signal and said reference signals to derive therefrom two local oscillation signals $\omega_O-\omega_R$ and $\omega_O+\omega_R$ and a received reference video signal $\omega_S$, a plurality of other primary converter means respectively connected with the other antennas and each with both of said sources, said latter converter means utilizing the received signals in such antennas, said reference signals and said received reference video signal $\omega_S$ to derive additional received video signals from such other antennas co-phased with the received reference video signal while imparting respective phase shifts to the local oscillation signals $\omega_O+\omega_R$ corresponding to those of the received signals in such other antennas relative to that in the one antenna, and imparting respective phase shifts to the local oscillation signals $\omega_O-\omega_R$ in the respective other primary converter means to form the phase-conjugates of the respective received signals in such other antennas, and means phasing the antennas system to transmit a signal in a selected direction related to but differing from the incidence direction of the pilot beam thereon, including a plurality of transmission phase control means for the respective antennas producing signals $\omega_R-\omega_S'$ carrying predetermined relative phase shifts graduated progressively along the array in accordance with the phase differences resulting from spacings between the array antennas, where $\omega_S'$ represents a signal to be transmitted, and a plurality of transmitting converter means utilizing said phase shifted signals $\omega_R-\omega_S'$ and said local oscillation $\omega_O-\omega_R$ to derive transmission signals $\omega_O-\omega_S'$ applied to the respective antennas for transmitting in such other direction.

10. The antenna system defined in claim 9, wherein the primary converter means for the respective antennas in producing the received video signal $\omega_S$ produces a signal $\omega_R-\omega_S$, said system further comprising a plurality of reception phase control means responsive to the respective antenna received signals $\omega_R-\omega_S$ and utilizing the low-frequency reference signal $\omega_R$ phase-shifted by progressive increments for the respective antennas along the array in relation to the phase difference resulting from the spacings between the array antennas, thereby to derive substantially co-phased received video signals $\omega_S$ from the antennas from a received beam signal incident on the array in a direction related to but differing from the incidence direction of the pilot beam thereon.

PO-1050
(5/69)

UNITED STATES PATENT OFFICE
CERTIFICATE OF CORRECTION

Patent No. 3,611,381 Dated October 5, 1971

Inventor(s) Fritz K. Preikschat, Orral W. Ritchey and John H. Nitardy

It is certified that error appears in the above-identified patent and that said Letters Patent are hereby corrected as shown below:

In the Abstract:

Line 25, $\omega_O - \omega_S$ , should read $\omega_O - \omega'_S$

In the Claims:

Claim 3, line 2, delete "high-frequency" and insert therefor --transmitting--.

Signed and sealed this 18th day of April 1972.

(SEAL)
Attest:

EDWARD M.FLETCHER,JR.
Attesting Officer

ROBERT GOTTSCHALK
Commissioner of Patents